United States Patent [19]

Shields

[11] Patent Number: 5,054,733

[45] Date of Patent: Oct. 8, 1991

[54] CONTAINER SUPPORT DEVICE

[76] Inventor: Michael P. Shields, Box 91, Mammoth Lake, Calif. 93516

[21] Appl. No.: 480,473

[22] Filed: Feb. 14, 1990

[51] Int. Cl.⁵ .............................................. A47K 1/08
[52] U.S. Cl. .................................. 248/313; 248/310; 248/316.2; 248/154
[58] Field of Search ............ 248/154, 146, 313, 311.2, 248/310, 316.2

[56]  References Cited

U.S. PATENT DOCUMENTS

| 385,522 | 7/1888 | Pierce | 248/310 |
|---|---|---|---|
| 1,309,224 | 7/1919 | Sonnemann | 248/313 X |
| 1,365,405 | 1/1921 | Howard | 248/310 X |
| 3,129,569 | 4/1964 | Ballantyne | 248/310 X |
| 3,491,976 | 1/1970 | Larson . | |
| 3,891,171 | 6/1975 | Samuelian et al. | 248/310 X |
| 4,040,549 | 8/1977 | Sadler . | |
| 4,634,089 | 6/1987 | Wright et al. . | |
| 4,643,381 | 2/1987 | Levy . | |
| 4,645,157 | 2/1987 | Parker . | |
| 4,693,440 | 9/1987 | Lalonde . | |
| 4,749,112 | 6/1988 | Harper . | |
| 4,767,092 | 8/1988 | Weatherly . | |
| 4,828,211 | 5/1989 | McConnell et al. . | |
| 4,836,488 | 6/1989 | Ross . | |

Primary Examiner—Alvin C. Chin-Shue
Attorney, Agent, or Firm—Lyon & Lyon

[57] ABSTRACT

An adjustable support device particularly adapted for use in a vehicle for removably securing therein an open container to prevent the spillage of the contents thereof. The support device includes a pair of adjacent ring members secured together so as to prevent separation thereof while allowing for relative rotation about a common central axis. In one embodiment of the invention, the lower ring member is defined by the upper portion of a base member which also defines a horizontal beverage container support surface and a non-skid lower bottom surface adapted to rest on a horizontal surface in a vehicle. A plurality of equidistantly spaced gripping members comprised of a pair of arcuate portions joined at their inwardly projecting ends by one or more hinges are carried by and disposed about and between the ring members, such that upon imparting relative rotation to the ring members, the gripping members are caused to pivot about their centrally disposed hinges and project radially inwardly of the ring members to abut and secure a beverage container within the ring members opposite relative rotation of the ring members causes the gripping members to pivot about their hinges in an opposite direction and retract radially outwardly to release the beverage container.

46 Claims, 6 Drawing Sheets

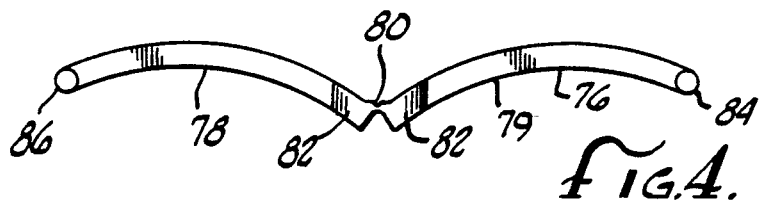
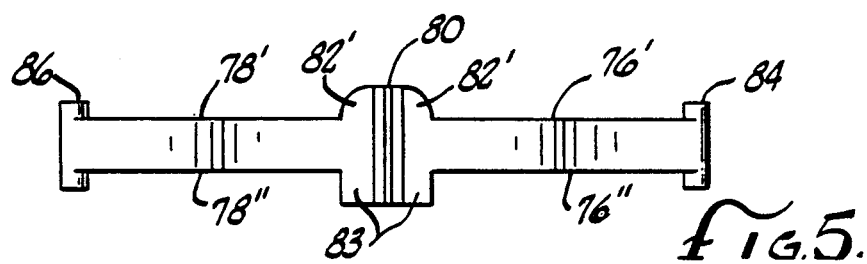
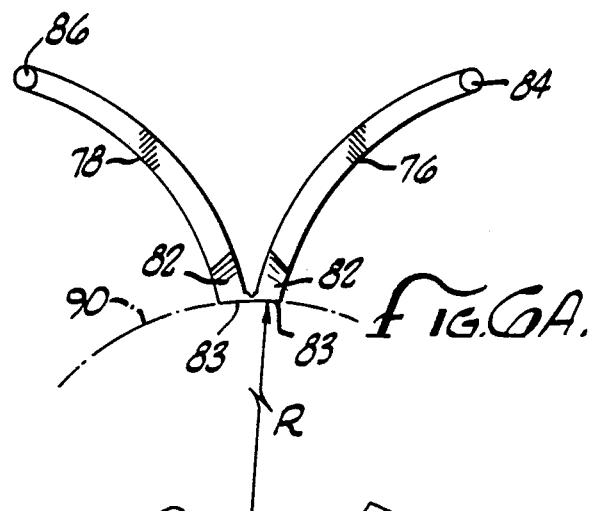
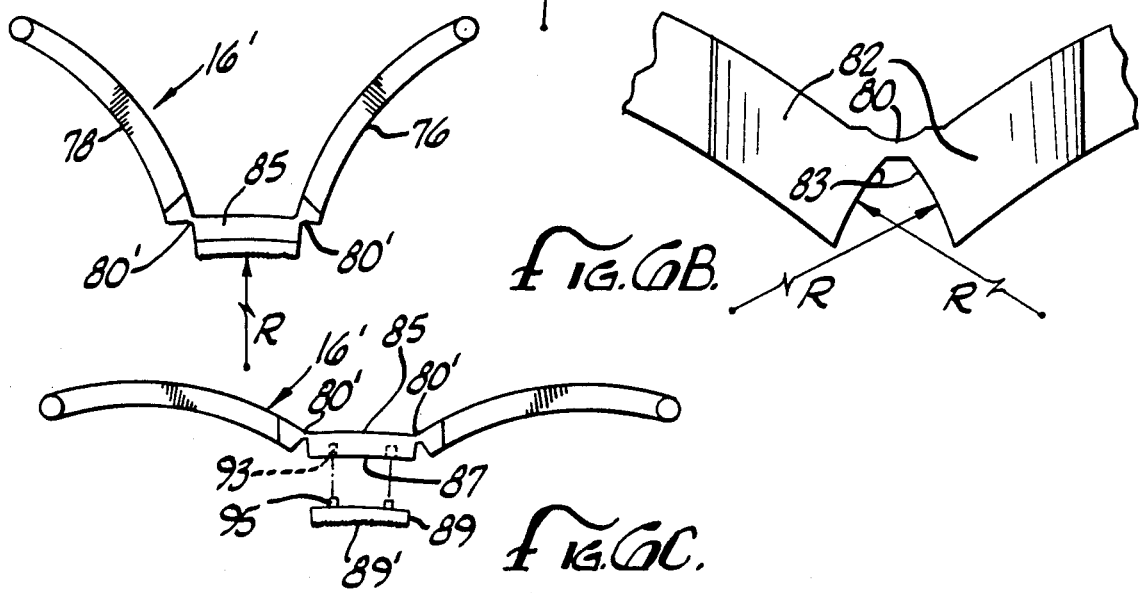

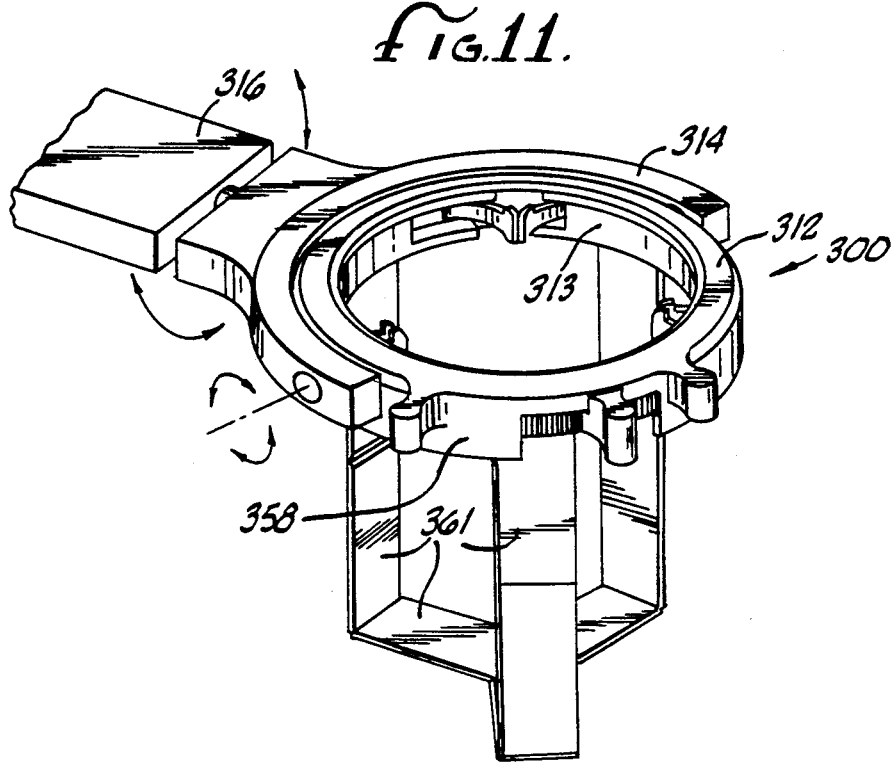
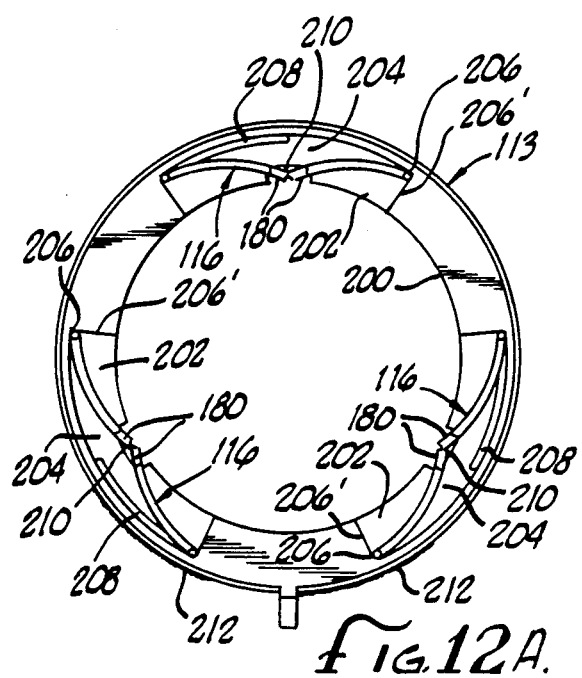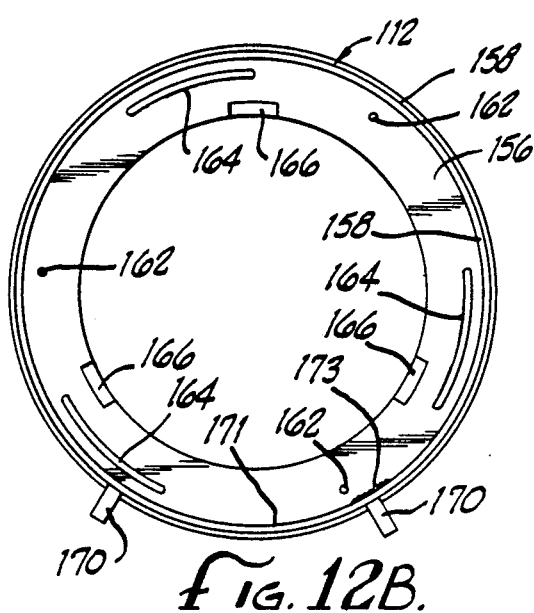

CONTAINER SUPPORT DEVICE

BACKGROUND OF THE INVENTION

The present invention is related to a support/holding device particularly adapted for use in automobiles, boats and other vehicles for holding differently sized and shaped drinking cups, open bottles, and beverage cans in an upright position to prevent spillage. The problem of spilling a cup of coffee or other beverage from a free standing container while travelling in a vehicle is well known and widely experienced. While drinking cups which are tapered downwardly and outwardly to define an enlarged base surface have been designed to provide an inherently stable free standing vessel for vehicular use, such cups are still subject to spillage when the vehicle undergoes rapid changes in motion. In addition, such cups are used in place of the original container in which the beverage is marketed, thus creating a potential for spillage when the volume of the tapered cup is insufficient to hold the entire contents of the beverage's original container. As such tapered cups generally have a low profile to reduce their center of gravity when full, their capacity is generally quite limited, greatly limiting their utility.

Attempts to provide support in a vehicle for the drinking cup, bottle or beverage can in which the beverage is sold typically employ some form of recess or aperture in a horizontally disposed surface, or a hanging wire basket type container which is pivotally secured to some form of back mounting plate. Such devices, however, are not portable and are limited to holding beverage containers within a very limited size range whereas various types of beverages are merchandised in cups, cans or other containers of various sizes and shapes.

In addition to being able to provide a stable device for accommodating different shapes and sizes of beverage cups or other containers, it is important that such a holding device be capable of firmly gripping the beverage container to prevent slippage or tilting of the container within the device upon directional or velocity changes in the vehicle as such movement of the container within the device would also likely result in spillage. While various types of holding devices have heretofore been developed for securely gripping and supporting differently sized and shaped beverage containers, they are very limited in their use as they require fixed installation and, if not designed into the vehicle as original equipment, are also obtrusive. In boats when such devices may not be so obtrusive, they are nevertheless limited to holding the beverage container in a fixed location. Examples of such devices are found in U.S. Pat. Nos. 4,645,157 and 4,828,211.

It would be highly desirable to provide a beverage container holding device which not only is readily adjustable to securely hold therein differently sized and shaped beverage containers but which also retains the portability advantage of the large based tapered drinking cups. Accordingly, such a device should also be free standing and portable, yet highly stable so that the user can drink directly from the container with the device secured thereto and rest the holding device and open container on a flat surface in a moving vehicle without fear of spillage. The device should also allow for the beverage container to be readily removable so that the user can drink directly from the container should he or she so desire without any encumbrance of the holding mechanism and with minimal risk of spillage during removal. It would also be highly desirable if the holding mechanism of such a device were adaptable for use in a fixed mounting where desired. Such a mechanism would then not only retain the adjustability advantages of the fixed devices disclosed in the above-cited patents, but additionally be useable either as a fixed holder or as a portable free standing adjustable support and thus provide a distinct improvement over the beverage holders currently in use. Such a device and mechanism is disclosed and claimed herein.

SUMMARY OF THE INVENTION

Briefly, the present invention comprises an adjustable support device particularly adapted for use in an automobile, boat, or other mode of transportation for releasably securing therein differently sized and configured beverage cups, cans, bottles or other beverage containers to prevent spillage of the contents thereof when the vehicle undergoes a change in motion. The support device of the present invention includes a pair of adjacent ring members which are secured together so as to prevent separation thereof while allowing for relative rotation thereof about a central common axis. A plurality of radial gripping flanges are carried by and project outwardly from the ring members which are adapted to be grasped by the user to facilitate relative rotation of the ring members. A plurality of equidistantly spaced gripping members are carried by and disposed about and between the ring members such that upon imparting relative rotation to the ring members, the gripping members are caused to project radially inwardly of the ring members to abut and secure a beverage container within the ring members. Opposite relative rotation of the ring members causes the flexible gripping members to retract radially outwardly and release the beverage container.

In one embodiment of the invention, the lower ring member is defined by the upper portion of a frustoconically shaped base member. The base member defines an interior horizontal beverage container support surface therein and a nonskid enlarged lower bottom surface such that upon disposing the beverage container on the support surface and tightening the gripping members about the beverage container, the support device is secured to the beverage container. This securement and the weight and configuration of the base member provide a portable and free standing yet highly stable support for the beverage container for use in vehicles. Such a device is also useful in the home, as for example to support a drinking glass used by a physically handicapped person or a baby bottle or to provide a portable coaster on the underside of a glass or cup.

In a second embodiment of the invention, the lower ring member is separable from the base member such that the interconnected ring members and the flexible gripping members carried thereby can be raised upwardly with respect to the interior container support surface in the base member and fixed in such a raised position, allowing the gripping members to abut and secure the holding device to the beverage container at a higher location on the beverage container. When using the beverage container holding device with conventional tapered drinking cups, raising the elevation of the points of gripping contact with the cup allows the cup to be held about a portion of larger diameter, thereby enabling the holding device to be used with smaller sized cups than could otherwise be secured therein.

In a modification of the second embodiment, the base is not employed and one of the connected ring members is provided with an external mounting bracket for securing the interconnected rings to a fixed surface by means of a gimbaled mounting. In such a modification, a plurality of collapsible support straps are preferably provided which, upon deployment, project downwardly from and across the inner connected rings to form a bottom support for a beverage container disposed therein. In yet another modification of the second embodiment of the invention, the interconnected ring members are employed without the gimbaled mounting and support straps, and are mounted in an aperture or recess in vehicle console to releasably secure therein a wide variety of differently sized and shaped beverage cups, cans, bottles and other containers to prevent spillage of the contents thereof when the vehicle undergoes rapid changes in motion.

In all of the preferred embodiments of the present invention, the gripping members which are carried by the ring members are each comprised of a pair of arcuate portions joined at their inwardly projecting adjacent ends either in a single hinge located at the midpoint of the gripping member, or in multiple hinges disposed in the central portion of the gripping member. Enlarged container gripping surfaces are defined by the gripping members adjacent the centrally disposed hinges for engaging the beverage container. A vertically disposed stud is defined by and projects upwardly and downwardly from the extended ends of each arcuate portion. The upwardly projecting portion of the stud on one arcuate portion of each gripping member is held in a slot in one of the ring members while the downwardly projecting portion of the stud is disposed within an arcuate guide channel on the other ring member. Conversely, the upwardly projecting portion of the stud on the other arcuate portion of each gripping member is disposed within an arcuate guide channel on said one ring member and the downwardly projecting portion of said stud is held within a slot in said other ring member.

As a result of the aforesaid configuration, when one ring member is rotated in a first direction with respect to the other ring member, the extended ends of the gripping members are caused to move along the arcuate guide channels toward one another, causing the gripping members to pivot at their centrally disposed hinges as the hinges and adjacent gripping surfaces move radially inwardly with respect to the ring members to effect gripping contact with the beverage container axially disposed within the secured ring members. A plurality of raised radial ridges are preferably defined by adjacent surfaces of the connected ring members so as to create resistance to such relative movement and thus maintain the position of the ring members upon relative rotation thereof to maintain the gripping surfaces in continual gripping contact with the beverage container. When in such gripping contact, the arcuate portions of the gripping members are flexed so as to provide a spring action, urging the gripping surfaces of the gripping members against the outer surface of the beverage container, thereby creating an adjustable flexure pressure against the container and further enhancing the securement of the holding device to the beverage container. When opposite relative rotation is imparted to the ring members, the extended ends of each of the flexible members are pulled apart along the arcuate guide channels, causing the gripping members to again pivot at their respective hinges, but in an opposite direction, so as to effect a radial retraction of the gripping surfaces defined by the hinge members, thereby releasing the beverage container.

Such a mechanism thus allows the beverage container gripping surfaces defined by the flexible gripping members to be collectively moved between an inwardly extended container securement position and an outer position substantially flush with the interior surfaces of the ring members thereby providing secure gripping contact for a wide range of differently sized and shaped beverage containers regardless of the material of which the container is constructed.

It is the principal object of the present invention to provide an improved support device for open beverage containers for use in all types of transportation vehicles to prevent spillage when the vehicle undergoes changes in motion.

It is another object of the present invention to provide an adjustable and highly versatile support device particularly adapted for use in vehicles for releasably securing therein differently sized and shaped beverage cups, cans, bottles, and other containers to prevent spillage of the contents thereof during travel.

It is a further object of the present invention to provide an adjustable device for releasably securing therein differently sized and shaped beverage cups, cans, bottles, and other containers which can be used in the home to prevent spillage of the contents thereof and to provide the beverage container with a portable coaster to prevent furniture damage.

It is yet another object of the present invention to provide an adjustable mechanism for releasably securing therein differently sized and shaped beverage cups, cans, bottles and other containers which is adaptable for use in vehicles to prevent spillage during travel in either a free standing, portable, and highly stable beverage container support device or in a fixed beverage container support device.

These and other objects and advantages of the present invention will become readily apparent from the following detailed description taken in conjunction with the accompanying drawings.

BRIEF DESCRIPTION OF THE DRAWINGS

FIG. 4 is a top view of one of the flexible gripping members of the present invention.

FIG. 5 is a front view of one of the flexible gripping members of the present invention.

FIG. 6A is a top view of one of the flexible gripping members of the present invention illustrating the desired curvature of the container gripping surfaces thereon.

FIG. 6B is an enlarged view of the configuration of the living hinge portion of one of the flexible gripping members.

FIG. 6C is a top view of an alternate embodiment of the gripping member of the present invention.

FIG. 6D is a top view of the alternate embodiment of the gripping member illustrating the attachment of the foot member thereto.

FIG. 11 is a perspective view of a modified form of the second embodiment of the present invention.

FIG. 12A is a top view of the lower ring member of a modified form of the second embodiment of the present invention.

FIG. 12B is a bottom view of the upper ring member of a modified form of the second embodiment of the present invention.

DESCRIPTION OF THE PREFERRED EMBODIMENTS

Figure 1:
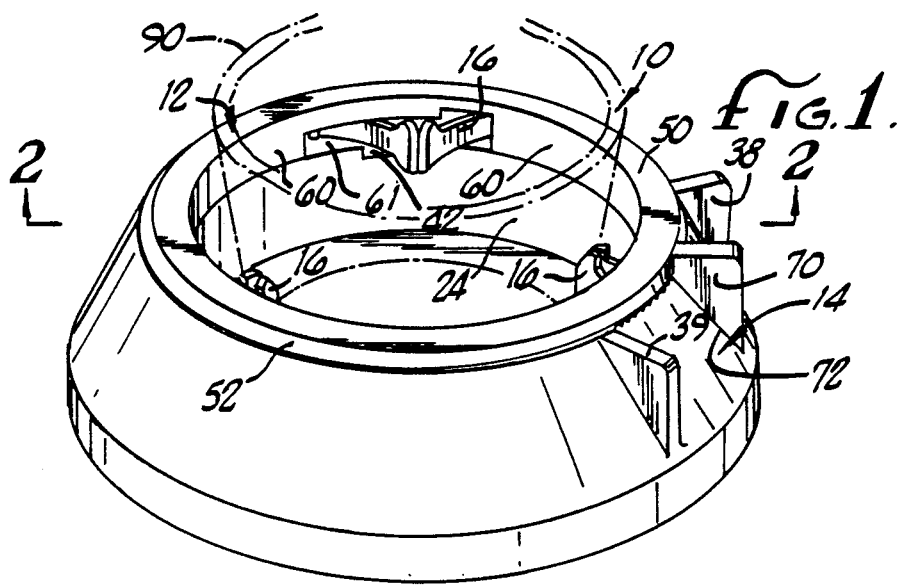
FIG. 1 is a perspective view of the support device of the present invention.
Figure 2:
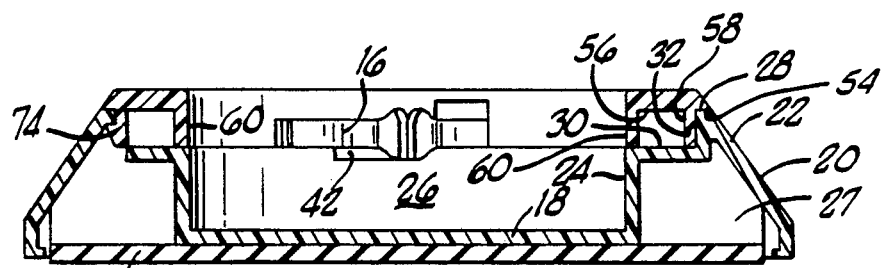
FIG. 2 is a sectional view taken along lines 2—2 of FIG. 1.
Figure 3:
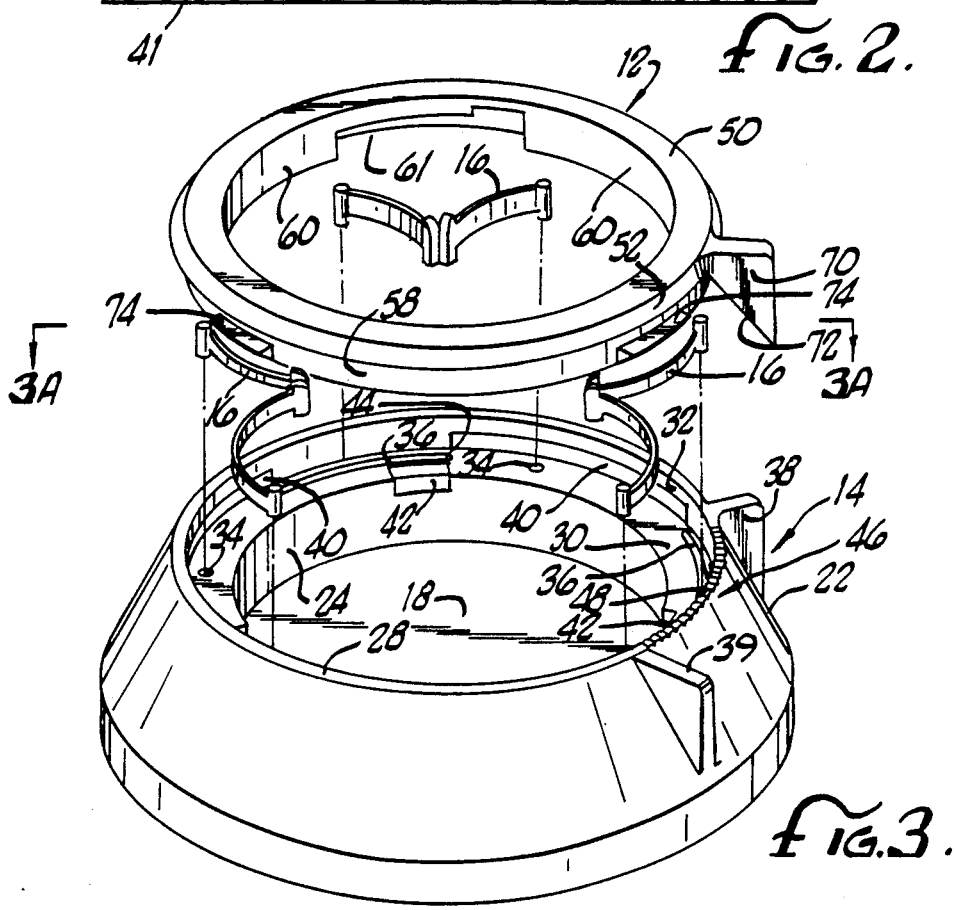
FIG. 3 is an exploded view of the support device of the present invention illustrating the separate components thereof.
Figure 3A:
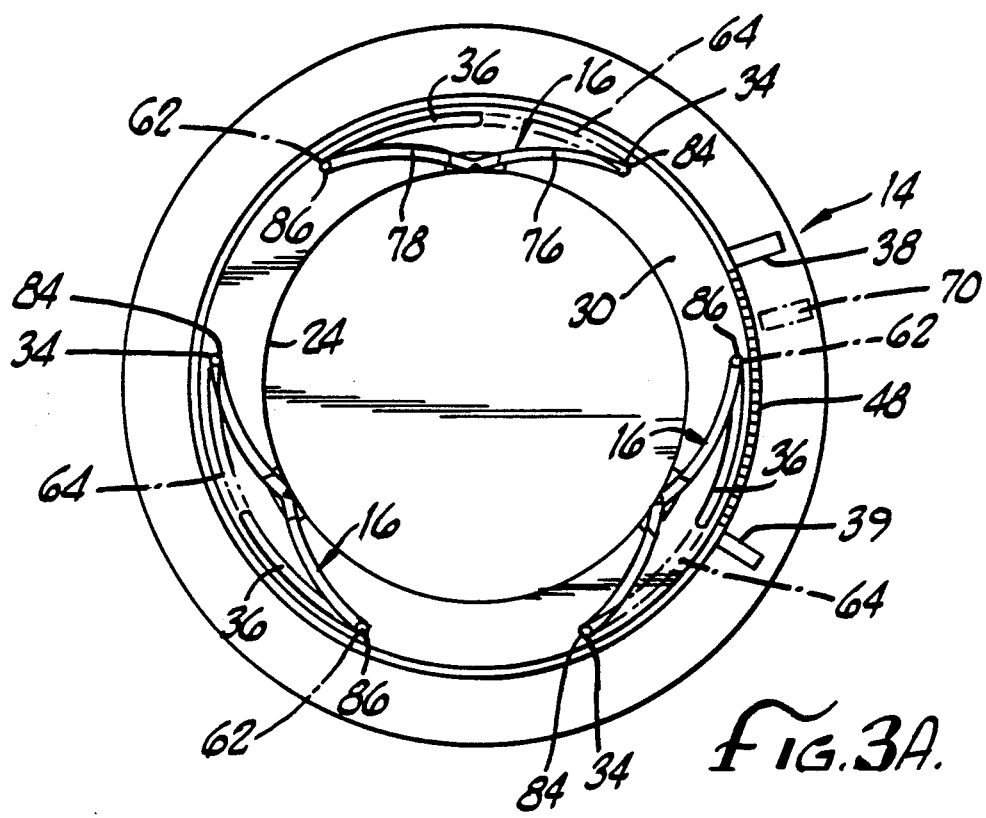
FIG. 3A is a top view of support device of the present invention with the upper ring member removed, the gripping members in a retracted position and illustrating the positioning of the guide channels, the gripping member retainer slots, and the exterior gripping flange of the upper ring member in phantom lines.

Referring now in detail to the drawings, the portable support device 10 illustrated in FIGS. 1-6 comprises an upper ring member 12, a lower frustoconical base 14 and a plurality of equidistantly spaced beverage container gripping members 16 carried by and disposed between ring members 12 and base 14. In the preferred embodiment of device 10 illustrated in the drawings, three such gripping members are employed. Base 14 is preferably molded from a high density polymer material such as ABS plastic and defines a circular beverage container support plate 18, an outer wall 20 having a tapered outer surface 22, a cylindrical inner wall 24 extending upwardly from the perimeter of the support plate 18 and defining a beverage container receiving area 26, and a plurality of inner structural support ribs 27 extending between the outer wall 20 and inner wall 24. Outer wall 20 defines a upper annular horizontal bearing surface 28 adjacent the upper end of the outer tapered surface 22, an interior horizontal bearing surface 30 extending radially between the upper end of inner wall 24 and an outwardly disposed cylindrical wall 32 extending between the upper bearing surface 28 and interior bearing surface 30. As seen in FIGS. 3 and 3A, interior bearing surface 30 defines three equidistantly spaced vertical cylindrical slots 34 and three equidistantly spaced arcuate guide channels 36 which are disposed between slots 34. A pair of spaced exterior gripping flanges 38 and 39 are formed with and project radially outwardly from the tapered outer surface 22 of base wall 20. A circular non-skid pad 41 made of a rubber or other material having a high coefficient of friction is secured to the underside of base 14 by an adhesive or other suitable fastening means.

Cylindrical wall 32 of base 14 defines a plurality of arcuate recesses 40 therein for use in securing the upper ring member 12 to the base 14 as will be later described. Cylindrical inner wall 24 of base 14 defines three recessed areas 42 in the upper surface thereof inwardly adjacent common end portions 44 of the arcuate glide channels 36. The portion 46 of upper bearing surface 28 disposed between exterior gripping flanges 38 and 39 preferably defines a series of radial ridges 48 therein to provide increased frictional contact between the base 14 and upper ring member 12 for reasons which will also be described later herein.

Figure 3B:
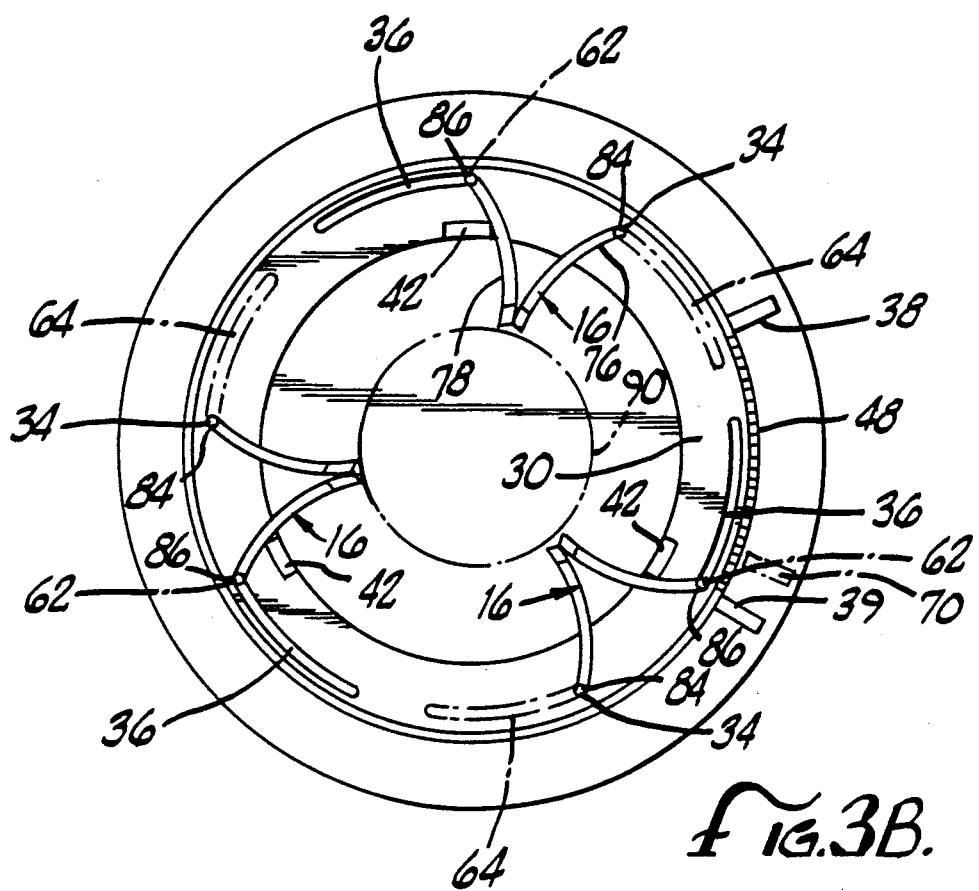
FIG. 3B is a top view of support device of the present invention with the upper ring member removed, the gripping members in an extended position and illustrating the positioning of the guide channels, the gripping member retainer slots, and the exterior gripping flange of the upper ring member in phantom lines.
Figure 3C:
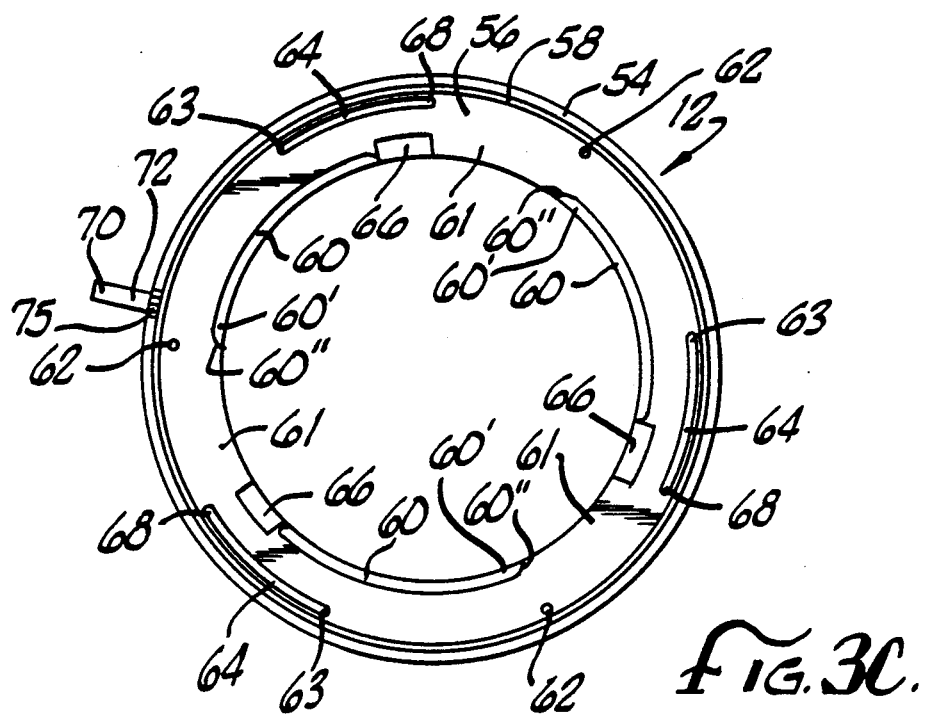
FIG. 3C is a bottom view of the upper ring member of the present invention.

Upper ring member 12 is preferably molded from a similar material as base member 14 and is disposed in base 14 on interior bearing surface 30 such that ring member 12 is rotatable on bearing surface 30 about the beverage receiving area 26. Ring member 12 defines an upper surface 50, a tapered outer surface 52, an annular outer bearing surface 54, an annular interior surface 56, and an outer cylindrical depending wall 58 disposed between surfaces 54 and 56. As seen in FIG. 3, ring member 12 also includes three equidistantly spaced arcuate wall portions 60 depending from the inner edge of upper surface 50 extending parallel to wall 58 and defining arcuate openings 61 therebetween for the passage of the gripping members 16 therethrough. Three equally spaced vertical cylindrical slots 62 are provided in annular surface 56, each being spaced inwardly from the common ends 60' of wall portions 60 as seen in FIG. 3C. Three equidistantly spaced arcuate guide channels 64 are also provided in surface 56 which define the same radius of curvature as guide channels 36 in base 14. Recessed areas 66 are provided in surface 56 inwardly adjacent common end portions 68 of the arcuate guide slots 64. An exterior gripping flange 70 is provided on ring member 12 which extends outwardly therefrom between gripping flanges 38 and 39 on base 14, with the interior depending surface 72 of flange 70 extending parallel to the tapered outer surface 22 of base 14. A plurality of radial raised ridges 75 are provided in outer annular bearing surface 54 inwardly adjacent gripping flange 70 which abut the ridges 48 on surface 28 of base 14 to increase the frictional contact between ring member 12 and base 14 and prevent inadvertent relative rotation between the ring member and base.

A plurality of upwardly and outwardly tapered locking tabs 74 are provided in the outer wall portion 58 of ring member 12 which project into the arcuate recessed portions 40 in the cylindrical wall 32 of base 14 to secure ring member 12 to base 14 in a snap fitment so as to prevent separation thereof while allowing for rotation of ring member 12 and within base 14 or, alternatively, relative rotation thereof about their common central axis in response to manual movement of the radial gripping flange 70 on ring member 12 between the two gripping flanges 38 and 39 on base 14. The degree of such relative rotation is limited by the travel of locking tabs 74 back and forth within arcuate recesses 40 in base 14 which acts to prevent gripping flange 70 from abutting either of gripping flanges 38 or 39 whereupon it would then be difficult to separate the adjacent gripping flanges to effect further relative rotation of ring member and base.

The gripping members 16 illustrated in FIGS. 3, 4, 5, 6A and 6B are preferably of single piece construction and molded of a flexible material such as polypropylene. Each gripping member defines a pair of arm portions 76 and 78 which are preferably arcuate in configuration and are joined at their adjacent inwardly directed ends in a centrally disposed polypropylene type living hinge 80, formed by a substantial reduction in the thickness of members 16 at hinges 80. A typical configuration of a living hinge 80 is shown in detail in FIG. 6B. Arcuate portions 76 and 78 are preferably rectangular in cross section and further define upper flat surfaces 76' and 78', lower flat surfaces 76" and 78", vertically extended gripping portions 82 immediately adjacent hinges 80, and upwardly and downwardly projecting cylindrical studs 84 and 86 at their extended ends. The upper ends 82' of gripping portions 82 are preferably tapered to facilitate entry of a beverage container therebetween in the event the gripping members 16 are not adequately retracted, and the container abutment surfaces 83 of gripping portions 82 are preferably curvilinear to increase the area contact of surfaces 83 with the curved outer surface of the beverage container 90 as illustrated in FIG. 6A. The radius of curvature R defined by surfaces 83 is preferably equal to that of a conventional soft drink or beer can which is approximately 1.25 inches. Studs 84 and 86 are sized so as to be received in the manner to be described within the vertical slots 34 and 62 and in guide channels 36 and 64 in base 14 and ring member 12.

The gripping members 16 are carried by and disposed between surfaces 56 and 30 of the upper ring member 12 and base 14 with each of studs 84 extending downwardly into a slot 34 in annular surface 30 and upwardly into a guide channel 64 on annular surface 56. Conversely, studs 86 on each gripping member 16 extend downwardly into a guide channel 36 in surface 30 and upwardly into a slot 62 in surface 56. The lower flat surfaces 76" and 78" of gripping members 16 are disposed against the annular surface 30 of base 14 and the upper flat in surfaces 76' and 78' of the respective arcuate portions 76 and 78 of the gripping members 16 are disposed against the annular surface 56 of the ring member 12.

In the retracted position, the gripping members 16 are extended with the enlarged gripping portions 82 thereof being disposed within the aligned superimposed recesses 42 and 66 in the base 14 and ring member 12 so as to be substantially flush with the inner surfaces of the inner wall 24 of base 14 and arcuate wall portions 60 of ring member 12. The inner vertical surface 79 of each of arcuate portions 76 bears against a curvalinear end 60" of one of wall portions 60. In the retracted position, the outwardly projecting gripping flange 70 on ring member 12 is in close proximity to radial gripping flange 38 on base 14 and the holding device 10 is ready to receive and secure therein a cup or other beverage container 90 such that the bottom surface of the container rests on the upper surface of container support plate 18.

Upon placing one's fingers on gripping flange 70 of ring member 12 and thumb on the gripping flange 39 of base 14 and drawing the two flanges toward one another, either the upper ring member 12 rotates within base 14 or the ring member and base are caused to counter rotate with respect to each other. In either case, upper ring member 12 and base member 14 are caused to undergo relative rotation about their central common axis. As this occurs, the extended end of arcuate portion 78 of each gripping member 16 is caused to move with the ring member 12 and with respect to base 14 by virtue of the stud 8 thereon being disposed within one of slots 62 in the ring member 12. Concurrently, the other end of each gripping member is moving with base member 14 and with respect to ring member 12 by virtue of the stud 84 thereon being disposed in one of the slots 34 in base 14. The opposite ends of each gripping member are thus drawn together along the arcuate paths defined by the guide channels 36 and 64. Concurrently, each of the arcuate portions 76 and 78 of the gripping members 16 pivot in opposite directions about centrally disposed hinges 80 as the hinges and the adjacent extended enlarged gripping portions 82 move in a substantially radial direction inwardly of the superimposed base 14 and ring member 12 until the abutment surfaces 83 defined by gripping portions 82 abut the outer surface of cup 90 as seen in FIG. 3B. Upon releasing the radial gripping flanges 39 and 70 on the base and ring member, the frictional contact between the raised ridges 48 and 75 on the base and ring member will maintain the relative positioning between the base and ring member and thus maintain the gripping portions 82 of the gripping members 16 in continual abutment with beverage container 90 to secure the container within the support device 10. As the gripping members are constructed of a flexible material, when urged against the beverage container, they will flex and the natural spring action therein will cause the abutment surfaces 83 thereon to bear against the container, securing the beverage container firmly within the holding device 10

The tight securement of the cup or other beverage container to the support device 10 together with the weight of the support device and the anti-skid pad 41 on the underside of the enlarged base 14 will prevent spillage of the contents of the cup when the cup and support device 10 are resting on a surface in a vehicle and the vehicle undergoes changes in motion. With the support device 10 so secured to the cup or other beverage container 90, the user can easily drink from the container without having to remove the support device therefrom. However, to remove the beverage container from the support device, it is only necessary to grasp the radial flanges on the base 14 and ring member 12 and counter-rotate the ring member with respect to the base so as to effect retraction of the gripping members 16 from the beverage container. As the gripping members are retracted, the inner vertical surfaces 79 of arcuate portions 76 bear against the ends 60" of wall portions 60 which are preferably tapered inwardly as seen in FIG. 3C to accommodate the curvature of arcuate portions 76. By extending wall portions 60 such that surfaces 79 of the gripping members 16 are drawn into contact with the ends 60" of the wall portions, the arcuate portions 76 of the flexible gripping members are caused to deform slightly during retraction of the gripping members, resulting in a further retraction of the centrally disposed gripping portions 82 such that portions 82 can be withdrawn to a position substantially flush with the aligned inner surfaces of inner wall 24 of base 14 and wall portion 60 of ring member 12. As can be readily appreciated, a wide variety of sizes and shapes of containers can be held within device 10 due to the variable radial extension in the gripping surfaces of the flexible gripping members which can be achieved by virtue of the aforesaid construction.

The support device 10 can be constructed over a wide range of sizes and, if desired for particular applications, either fewer or more than three gripping members 16 could be employed. Three gripping members is preferred, however, as three equidistantly spaced gripping members provides excellent securement of the beverage container to the support device 10 and automatically positions the beverage container in the center of the support device for maximum stability while providing a wide range of adjustability to accommodate differently sized and shaped containers. Less than three gripping members would not provide as secure a containment for the beverage container while more than three would decrease the range of adjustability for the device while not significantly improving the securement of the device, at least not for cylindrically shaped beverage containers. It is to be understood, however, that for particular applications the above gripping mechanism could be employed for the securement of irregularly shaped containers or devices other than beverage containers wherein a different number of gripping members could be employed. For example, the internal surface of the support device could provide a gripping surface for a particular application other than a beverage container such that only one or two extensible gripping members 16 need be employed.

An alternate embodiment of the gripping members is illustrated in FIGS. 6C and 6D. The gripping member 16' illustrated herein differs from the prior embodiment in that gripping members 16' each define a pair of living hinges 80' adjacent a centrally disposed arcuate gripping portion 85. Gripping portions 85 like portions 83 of gripping members 16 preferably define a radius of curvature equal to that of a conventional soft drink or beer can. This curvature can be provided on the inner surface of the gripping portions 85 or, as seen in FIGS. 6C and 6D, on the inner surface 89' of the flexible arcuate foot member 89 secured to the centrally disposed gripping portions 85 of gripping members 16' by a pair of studs 95 and receiving apertures 93. Foot members 89 have a low shore hardness and high coefficient of friction for improving the gripping contact of the gripping members with slick container surfaces such as those made of glass. By providing a pair of hinges 80' in lieu of a single hinge the arcuate length of the gripping portions can be increased for improved gripping contact with the container. For particular applications, more than two hinges could also be utilized in the gripping members to provide improved gripping contact on irregular surfaces.

The gripping members 16 could also be formed in a straight lined "V-shaped" configuration wherein the leg portions of the "V" are straight and not arcuate as described above. However, while such a configuration would be operable so long as the angle between the two hinged straight leg portions were prevented from reaching 180°, it would either reduce the radial extension of the gripping members or prevent the gripping portions thereof from being retracted to a position flush with the inner surface of the ring member and thus be less desireable than the arcuate configuration.

It should also be noted that the support device 10 could be constructed without arcuate guide channels 36 and 64 in the base 14 and ring member 12 respectively as the extended ends of the gripping members could be secured and controlled solely by the studs 84 and 86 being held within their respective slots 34 and 62. In such a configuration, studs 84 would only project downwardly into slots 34 and studs 86 would only project upwardly into slots 62. The arcuate guide channels, however, will prevent any twisting of the guide members within the support device which could adversely affect the smooth operation of the support device.

As an example of a beverage container support device constructed in accordance with the above teachings, the base 14 is about 5.5 inches in diameter across the underside thereof, about one inch high and defines an inner diameter of about 4.1 inches across cylindrical wall 38. The apertures 34 and 62 in both base 14 and ring member 12 are disposed 120 degrees apart, and the centers of guide slots 36 and 64 in base 14 and ring member 12 are also disposed 120 degrees apart so as to provide equal spacings of the apertures and guide slots about both base 14 and ring member 12. Apertures 34 in base 14 are displaced approximately 35 degrees clockwise from the end 44' of guide slots 16, and apertures 64 in ring member 12 are similarly disposed about 35 degrees clockwise from the ends 68' of guide slots 64. The exterior radial grip flanges 38 and 39 on base 14 are spaced approximately 55 degrees apart with flange 38' being disposed substantially adjacent one of the ends 44' of a guide slot 36. The gripping members 16 are approximately 2.25 inches in length in an unstressed state with the cords defined by arcuate portions 76 and 78 defining an angle of 180 degrees therebetween. The arcuate portions 76 and 78 of gripping members 16 each define arcs of about sixty degrees over a radius of about one inch in an unflexed state and are about 0.18 inches in height and 0.09 inches in thickness. The preferred configuration and for living hinges 80 are illustrated in FIG. 6. It is to be understood that these dimensions are by way of example only.

Figure 7:
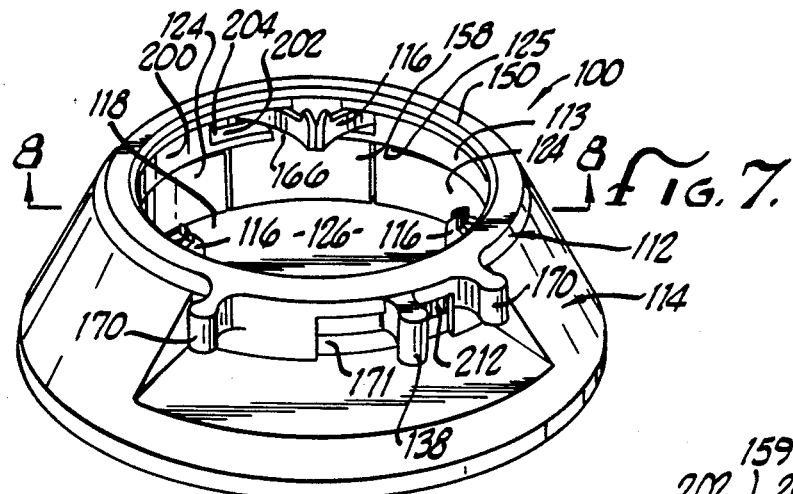
FIG. 7 is a perspective view of a second embodiment of the present invention showing the interconnected ring members in the lower position.
Figure 9:
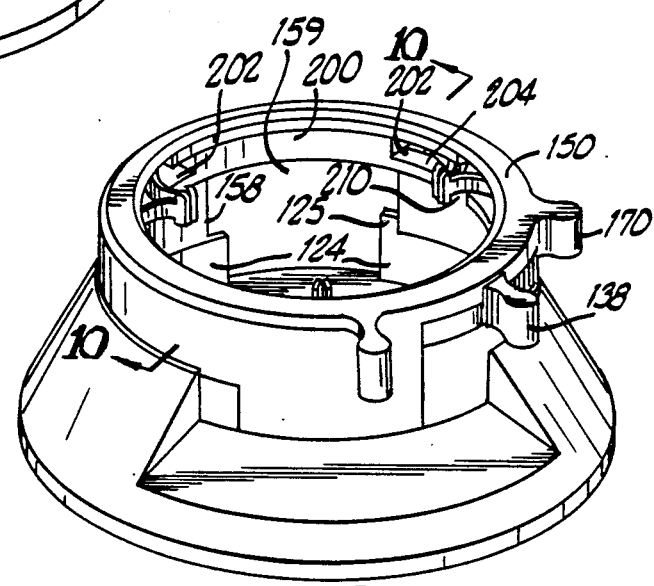
FIG. 9 is a perspective view of the second embodiment of the present invention showing the interconnected ring members in the raised position.
Figure 8:
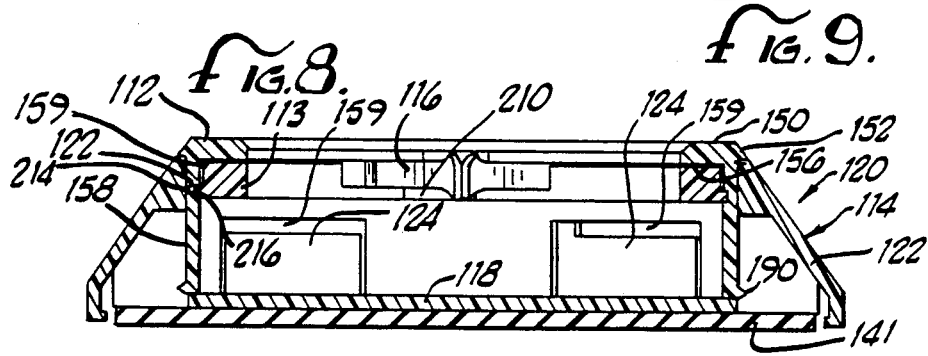
FIG. 8 is a sectional view taken along lines 8—8 of FIG. 7.

FIGS. 7-9 illustrate a second embodiment of a support device 100 constructed in accordance with the present invention. The second embodiment differs from the prior embodiment in that in the prior embodiment, frustoconical base 14 defined a lower ring structure in the open upper end thereof which cooperated with the upper ring member 12 and gripping members 16 to secure the beverage container. In the second embodiment, a second lower ring member is employed which is separate from the base member and secured to the upper ring member and with the upper ring member can be raised upwardly with respect to the interior beverage container support plate in the base and secured in the raised position to elevate the gripping members with respect to the beverage container thereby allowing even smaller tapered beverage containers to be tightly secured therein than would be possible with the flexible gripping members fixed at a lower position as in the prior embodiment.

The second embodiment of the support device 100 comprises an upper ring member 112, a lower ring member 113, a frustoconical base 114 and a plurality of gripping members 116. The component parts of the second embodiment of the invention are preferably constructed of the same materials as the component of the prior embodiment and, as will be seen, operate in substantially the same manner as the prior embodiment.

Base 114 includes an interior circular beverage container supporting base plate 118, an inclined outer wall 120, a cylindrical inner wall portion 122, and a plurality of arcuate wall portions 124 extending upwardly from the perimeter of base plate 118 about the beverage receiving area 126. Arcuate wall portions 124 are disposed below and define the same radius of curvature as inner wall portion 122 to define aligned upper and lower arcuate support surfaces for the interconnected upper and lower ring members 112 and 113. A plurality of interior structural support ribs 127 extend between wall 120 the arcuate wall portions 124. A rubber or other suitable non-skid pad 141 having a high coefficient of friction is preferably secured to the underside of base 114 as in base 14 of the prior embodiment. Further, while not believed necessary, additional weights (not shown) could be provided in either bases 14 or 114 to provide additional weight and stability to the device.

Upper ring member 112 defines an upper surface 150, a tapered outer surface 152, a flat horizontal annular interior surface 156 on the underside thereof, and a outer depending perimeter wall portion 158 having a plurality of areas 159 therein which receive the upstanding arcuate wall portions 124 of base 114 so as to be flush therewith. An annular flat lip 157 is provided between the upper end of wall portion 158 and the lower edge of tapered surface 152 which is adapted to abut the upper surface of base wall 120.

As seen in FIGS. 12A and 12B, annular interior surface 156 defines therein three equidistantly spaced vertical slots 162, three equidistantly spaced arcuate guide channels 164, and three recessed areas 166 which are arranged and function in the same manner as the corresponding elements 62, 64 and 66 in the prior embodiment. Upper ring member 112 also defines a pair of radially extending gripping flanges 170 which protrude from the exterior surface thereof and serve the same function as gripping flanges 70 on the base member 14 of the prior embodiment. A cut-out are 171 is provided in the depending perimeter wall portion 158 of the upper ring member 112 between the spaced gripping flanges 170 thereon and a pair of inwardly directed ribbed surfaces 173 are disposed defined by the interior of wall portions 158 adjacent gripping flanges 170.

The lower ring member 113 is disposed within the upper ring member 112 adjacent annular surface 156 and the upper end of the interior surface of wall portion 158. Lower ring member 113 defines an annular body portion 200 having three equidistantly spaced recessed areas 202 therein. Each of the recessed areas 202 defines a flat horizontal arcuate support surface 204 therein. Surfaces 204 each define therein a vertical slot 206 adjacent common end walls 206' of the recessed areas 202, an arcuate glide channel 208 and a recess 210 in surface 204. Each of the recesses 210 cooperates with one of the recessed areas 166 in the upper ring member 112 to receive the enlarged gripping portions 180 of gripping members 116 in the same manner as recessed 42 and 66 in the prior embodiment. Lower ring member 113 also includes a gripping flange 138 which projects radially outwardly from the body portion 200 through the cut-out area 171 in the upper ring member 112 and upwardly over the depending wall portion 158 of the upper ring member between radial flanges 170 thereon. The outer surface of body portion 200 also defines outwardly projecting ribbed surfaces 21 thereon which abut ribbed surfaces 173 on the upper ring member to increase the frictional contact between the upper and lower ring members. The annular depending wall 158 of the upper ring member 112 is provided with an annular channel 214 therein which receives an outwardly directed annular rib 216 formed on the lower end of body portion 200 of the lower ring member to secure the upper and lower ring members together to prevent separation thereof but allow relative rotation therebetween.

The flexible gripping members 116 of the second embodiment are of the same configuration as gripping members 16 of the prior embodiment, although gripping members having the configuration of members 16' illustrated in FIGS. 6C and 6D could be employed. The gripping members 116 are disposed between and mounted between the upper and lower ring members 112 and 113 within recessed areas 202 of the lower ring member 113 in the same manner in which gripping member 16 are disposed between and mounted in the upper ring member 12 and base 14 of the prior embodiment. Accordingly, by relative rotation of the upper and lower ring member 112 and 113 by means of radial gripping flanges 170 and 138, the gripping members 116 are caused to move substantially radially inwardly and outwardly of the rings to abut and secure a beverage container disposed therewithin.

Figure 10:
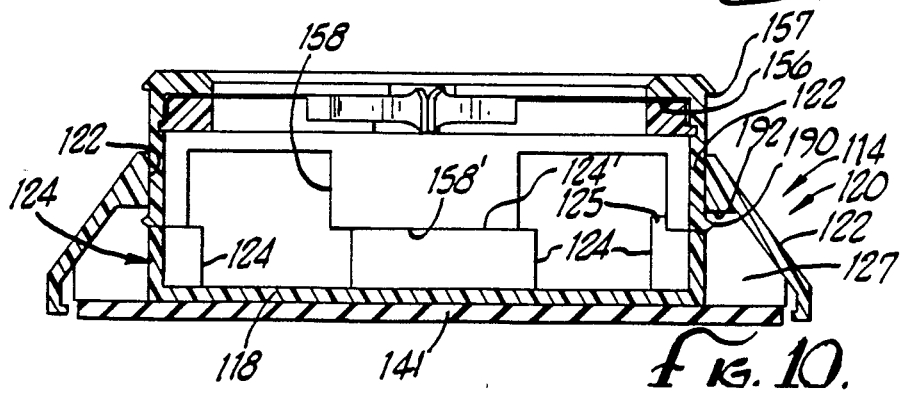
FIG. 10 is a sectional view of the second embodiment of the present invention taken along line 10—10 in FIG. 9.

When the upper and lower ring members 112 and 113 are disposed within base 114 in the lower position illustrated in FIGS. 7 and 8, the bottom surface 158' of the depending outer wall portion 158 of the upper ring member 112 is disposed adjacent base plate 118 and the upstanding arcuate wall portions 124 of base 114 are disposed in the cut out areas 159 of wall portion 158. In this position, the beverage container holding device 100 operates in the same manner as device 10. However, as the lower ring member 113 is a separate element secured by the upper ring member 112 and not defined by the base 14 as in the prior embodiment, the second embodiment allows the interconnected ring members 112 and 113 to be raised upwardly within base 114 to an elevated position illustrated in FIGS. 9 and 10, whereupon the upper end surface 124' of the upstanding arcuate wall portions 124 in base 114 are disposed below the bottom surfaces 158' of the depending perimeter wall portion 158 of the upper ring member 112. To secure the ring members in the elevated position, one need only rotate the ring members together with respect to the base member such that the bottom surfaces 158' of depending wall portion 158 will rest on the upper end surfaces 124' of wall portions 124 in base 114 and the outer surface of depending wall portion 158 abuts and bears against the adjacently disposed cylindrical wall portion 122 of base 114. To facilitate alignment of surfaces 158' and 124' upon rotation of the ring members, an upstanding stop 125 defined by a portion end of one of the arcuate wall portions 124 can be provided. Stop 125 limits the relative rotation of the ring members with respect to the base member by means of the abutment of an end of wall portion 158 in the upper ring member adjacent the cut out area 159 therein as seen in FIG. 9. In addition, a radially extending rib 190 can be provided adjacent the lower end of depending perimeter wall portion 158 which is adapted to abut a shoulder 192 defined by the outer wall 120 of base 114 to prevent the separation of the interconnected ring members from the base. Through their configuration, the adjustability of the support device is further enhanced.

A modified form of the second embodiment of the invention is illustrated in FIG. 11. The beverage container support device 300 shown therein differs from the second embodiment in that it does not include a base member and the upper ring member 312 employs a shortened depending annular perimeter wall portion 358 which extends about the lower ring member 313, but does not project downwardly therefrom as did wall portion 158 of the second embodiment. Otherwise the interconnected ring members 312 and 313 ar identical to ring members 112 and 113 with the exception that device 300 includes a gimbal mounting 316 secured to the perimeter wall portion 358 of the upper ring member 312 by bracket 314. A plurality of collapsible support straps 361 are also preferably secured to the ring members so as to extend downwardly therefrom and radially across the interior cylindrical area defined by the rings to provide a bottom support for a beverage container disposed therein. The operation of device 300 is otherwise the same as that described with respect to the second embodiment.

Various other changes and modifications may be made in carrying out the present invention without departing from the spirit and scope thereof. Insofar as these changes and modifications are within the purview of the appended claims, they are to be considered as part of the present invention.

I hereby claim:

1. An adjustable support device particularly adapted for use in a vehicle for releasably securing therein an open container to prevent the spillage of the contents thereof, said device comprising:
   a first ring member;
   a second ring member;
   means for securing said first ring member to said second ring member so as to allow relative rotation of said ring members about a common central axis; and
   a plurality of container gripping members carried by and disposed between said ring members, each of said gripping members having hinge means disposed intermediary the ends thereof and being adapted to pivot about said hinge means and project in a substantially radial direction from said ring members in response to relative rotation of said ring members to abut the container proximate said hinge means and secure said device to the container.

2. The support device of claim 1 including a base member, one of said ring members being defined by said base member and said base member additionally defining a first surface disposed below said gripping members for supporting a beverage container thereon and a second flat surface disposed below said first surface for supporting said device on a horizontal surface.

3. An adjustable support device particularly adapted for use in a vehicle for releasably securing therein an open container to prevent the spillage of the contents thereof, said device comprising:
   a first ring member;
   a second ring member;
   means for securing said first ring member to said second ring member so as to allow relative rotation of said ring members about a common central axis; and
   a plurality of container gripping members carried by and disposed between said ring members and adapted to project in a substantially radial direction from said ring members in response to relative rotation of said ring members to abut the container and secure said device to the container and wherein each of said gripping members define a pair of arm portions having extended ends and inwardly directed ends, hinge means for pivotally connecting said inwardly directed ends, and container abutment means adjacent said hinge means, one of said extended ends of each of said gripping members being fixed to said first ring member and moveable with respect to said second ring member and the other of said extended ends being fixed to said second ring member and moveable with respect to said first ring member such that relative rotation of said ring members causes said arm portions to undergo pivotal movement about said hinge means and said abutment means to move in a substantially radial direction inwardly toward or outwardly from the common central axis of said ring member for securing and releasing a container disposed within said ring members.

4. The support device of claim 3 wherein said arm portions of said gripping members are of an arcuate configuration.

5. The support devices of claims 3 or 4 wherein said gripping members and said hinge members are constructed of a flexible material and are of single piece construction.

6. The support devices of claims 3 or 4 wherein said hinge means comprises a living hinge disposed at a central location on each of said gripping members and said container abutment means comprises a pair of enlarged surfaces defined by the inwardly directed ends of said arm portions.

7. The support device of claim 6 wherein said enlarged surfaces are curvilinear such that upon said abutment means being moved radially inwardly toward the common central axis of said rings, said surfaces define a continuous curvilinear surface for abutting the container.

8. The support devices of claims 3 or 4 wherein said hinge means comprises a pair of living hinges, one of said hinges being disposed at each of the inwardly directed ends of said arm portions, and said container abutment means comprises a member extending between said hinges and having a curvilinear engagement surface adapted to abut the container upon said abutment means being moved radially inwardly toward the common central axis of said rings.

9. The support devices of claims 3 or 4 wherein the extended ends of s id gripping members define vertically disposed studs thereon, one of said studs on each of said gripping members extending upwardly from said gripping member and the other of said studs on each of said gripping members extending downwardly from said gripping member, said upwardly extending studs engaging one of said ring members and said downwardly extending studs engaging the other of said ring members such that upon imparting relative rotation to said ring members, one of the studs on each of said gripping members is caused to move in an arcuate path either toward or away from the other stud on said gripping member thereby causing said pivotal and radial movement of said gripping members.

10. The support device of claim 9 wherein each of said ring members define a plurality of equidistantly spaced slots therein for receiving one of said studs and securing said studs to one of said ring members.

11. The support devices of claims 3 or 4 wherein the extended ends of said gripping members define vertically disposed studs extending upwardly and downwardly therefrom, said first and second ring members define a plurality of equidistantly spaced slots therein and a corresponding plurality of equidistantly spaced arcuate guide channels therein, one of said studs on each of said gripping members extending into a slot on said first ring member and into a guide channel on said second ring member and the other stud of each of said gripping members extending into a slot on said second ring member and into a guide channel on said first ring member such that upon imparting relative rotation to said ring members, one of the studs on each of said gripping members is caused to move in an arcuate path either toward or away from the other stud on said gripping member thereby causing said pivotal and radial movements of said gripping members.

12. An adjustable support device particularly adapted for use in a vehicle for removably securing therein an open container to prevent spillage of the contents thereof said device comprising:

a base member including a friction contact surface adapted to rest on a horizontal surface in a vehicle, and a container support surface disposed above said contact surface;

an upper ring member rotatably mounted on said base member; and a plurality of container gripping members disposed between said upper ring member and said base member, each of said gripping members defining a pair of arm portions having extending ends and inwardly directed ends, hinge means for pivotally connecting said inwardly directed ends, and container abutment means adjacent said hinge means, one of said extended ends of each of said gripping members being fixed to said upper ring member and movable with respect to said base member and the other of said extended ends being affixed to said base member and movable with respect to said ring member such that relative rotation of said ring member and said base member causes said arm portions to undergo pivotal motions about said hinge means and said abutment means to move in a substantially radial direction inwardly or outwardly for securing and releasing a container disposed on said container support surface.

13. The support device of claim 12 wherein said arm portions of said gripping members are of an arcuate configuration.

14. The support devices of claims 12 or 13 wherein said hinge means comprises a living hinge disposed at a central location on each of said gripping members and said container abutment means comprises a pair of enlarged surfaces defined by the inwardly directed ends of said arcuate portions.

15. The support device of claim 14 wherein said enlarged surfaces are curvilinear such that upon said abutment means being moved radially inwardly toward the common central axis of said rings, said surfaces define a continuous curvilinear surface for abutting the container.

16. The support devices of claims 12 or 13 wherein said hinge means comprises a pair of living hinges, one of said hinges being disposed at each of the inwardly directed ends of said arm portions, and said container abutment means comprises a member extending between said hinges and having a curvilinear engagement surface adapted to abut the container upon said abutment means being moved radially inwardly toward the common central axis of said rings.

17. An adjustable support device particularly adapted for use in a vehicle for removably securing therein an open container to prevent spillage of the contents thereof, said device comprising:

a base member including a friction contact surface adapted to rest on a horizontal surface, a container support surface disposed above said contact surface, an annular bearing surface disposed above and about said container support surface, and a plurality of securement slots disposed in and equidistantly spaced about said annular bearing surface;

an upper ring member rotatably mounted on said bearing surface and defining therein a plurality of securement slots equidistantly spaced about said ring member; and a plurality of container gripping members disposed between said upper ring member and said annular bearing surface, each of said gripping members defining a pair of arm portions having extended ends and inwardly directed ends, hinge means for pivotally connecting said inwardly directed ends, container support means adjacent said hinge means and a vertically disposed stud on each of said extended ends one of said studs on each of said gripping members extending upwardly from said gripping member and into one of said securement slots on said upper ring member and the other of said studs of each of said gripping members extending downwardly from said gripping member and into one of said slots in said annular bearing surface such that upon imparting relative rotation to said ring member and said base member, one of the studs on each of said gripping members is caused to move in an arcuate path either toward or away from the other stud on said gripping member thereby causing said arm portions to undergo pivotal motion about said hinge means and said abutment means to move in a substantially radial direction inwardly or outwardly for securing and releasing a container disposed on said container support surface.

18. The support device of claim 17 wherein said arm portions of said gripping members are of an arcuate configuration.

19. The support devices of claims 17 or 18 wherein said hinge means comprises a living hinge disposed at a central location on each of said gripping members and said container abutment means comprises a pair of enlarged surfaces defined by the inwardly directed ends of said arm portions.

20. The support device of claim 19 wherein said enlarged surfaces are curvilinear such that upon said abutment means being moved radially inwardly toward the common central axis of said rings, said surfaces define a continuous curvilinear surface for abutting the container.

21. The support devices of claims 17 or 18 wherein said hinge means comprises a pair of living hinges, one of said hinges being disposed at each of the inwardly directed ends of said arm portions, and said container abutment means comprises a member extending between said hinges and having a curvilinear engagement surface adapted to abut the container upon said abutment means being moved radially inwardly toward the common central axis of said rings.

22. The support devices of claims 17 or 18 including a plurality of equidistantly spaced guide channels disposed on said ring member between said securement slots therein and a corresponding plurality of equidistantly spaced guide channels disposed on said annular bearing surface of said base member between said securement slots therein, each of said guide channels receiving therein portions of the extended ends of said arm portions of said gripping members.

23. The support devices of claims 12, 13, 17, or 18 including a pair of radial gripping flanges secured to and extended outwardly from said base member and a third radial flange secured to said ring member and extending outwardly therefrom between said radial flanges on said base members for facilitating rotation of said ring member on said base member.

24. The support device of claim 23 including means defined by said ring member and said base member for resisting rotation of said ring member within said base member upon said gripping members being urged radially inwardly against a container disposed on said container support surface.

25. The support device of claim 22 including a pair radial gripping flanges secured to and extended outwardly from said base member and a third radial flange secured to said ring member and extending outwardly therefrom between said radial flanges on said base member for facilitating rotation of said ring member on said base member.

26. The support device of claim 23 wherein said arm portions of said gripping members are of an arcuate configuration and said gripping members are formed of a flexible resilient material, are of single piece construction and said hinge means comprises one or more living hinges.

27. An adjustable support device particularly adapted for use in a vehicle for removably securing therein an open container to prevent spilling of the contents thereof, said device comprising:
   a base member having a container support surface therein;
   an upper ring member rotatably mounted on said base member; and
   a plurality of container gripping members carried by and disposed between said base member and said ring member, each of said gripping members having hinge means disposed intermediary the ends thereof and being adapted to pivot about said hinge means and project in a substantially radial direction from said ring members in response to relative rotation of said ring member and said base member to abut a container disposed on said container support surface proximate said hinge means and secure said device to the container.

28. An adjustable support device particularly adapted for use in a vehicle for removably securing therein an open container to prevent spilling of the contents thereof, said device comprising:
   a base member having a container support surface therein;
   an upper ring member rotatably mounted on said base member; and
   a plurality of contain gripping members carried by and disposed between said base member and said ring member and adapted to project in a substantially radial direction from said ring member in response to relative rotation of said ring member and said base member to abut a container disposed on said container support surface and secure said device to the container and wherein each of said gripping members defines a pair of arm portions having extended ends and inwardly directed ends, hinge means for pivotally connecting said inwardly directed ends, and container abutment means adjacent said hinge means, one of said extended ends of each of said gripping members being fixed to said ring member and moveable with respect to said base member and the other of said extended ends being fixed to said base member and moveable with respect to said ring member such that relative rotation of said ring member and said base member causes said arm portions to undergo pivotal movement about said hinge means and said abutment means to move in a substantially radial direction inwardly or outwardly for securing and releasing a container disposed on said container support surface of base member.

29. The support device of claims 28 and 26 wherein the extended ends of said gripping members define vertically disposed studs thereon, one of said studs on each of said gripping members extending upwardly from said gripping members and the other of said studs on each of said gripping members extending downwardly from said gripping member, all of the said upwardly extending studs engaging either said base member or said ring member and all of said downwardly extending studs engaging the other of said ring member or said base member such that upon imparting relative rotation to said ring member and said base member, one of the studs on each of said gripping members is caused to move in an arcuate path either toward or away from the other stud on said gripping member thereby causing said pivotal and radial movement of said gripping members.

30. An adjustable support device particularly adapted for use in a vehicle for removably securing therein an open beverage container to prevent spillage of the contents thereof, said device comprising:
   a first ring member;
   a second ring member;
   means for securing said first ring member to said second ring member so as to prevent separation thereof while allowing relative rotation thereof about a common central axis;
   a base member having a container support surface therein, said ring members being carried by said base member; and
   a plurality of container gripping members carried by and disposed between said ring members and adapted to project in a substantially radial direction from said ring member each of said gripping members having hinge means disposed intermediary the ends thereof and being adapted to pivot about said hinge means and project in a substantially radial direction from said ring members in response to relative rotation of said ring members to abut a container disposed on said container support surface proximate said hinge means and secure said device to the container.

31. The support device of claim 30 including means for elevating said ring members on said base members and securing said ring members in an elevated position.

32. An adjustable support device particularly adapted for use in a vehicle for removably securing therein an open beverage container to prevent spillage of the contents thereof, said device comprising:
   a first ring member;
   a second ring member;
   means for securing said first ring member to said second ring member so as to prevent separation thereof while allowing relative rotation thereof about a common central axis;
   a base member having a container support surface therein, said ring members being carried by said base member;
   a plurality of container gripping members carried by and disposed between said ring members and adapted to project in a substantially radial direction from said ring members in response to relative rotation of said ring members to abut a container disposed on said container support surface and secure said device to the container and means for elevating said ring members on said base members and securing said ring members in an elevated position, said elevating and securing means comprising a plurality of arcuate extensions depending from one of said ring members and a corresponding plurality of arcuate upstanding wall portions disposed on said base member about said container support surface such that said arcuate extensions are disposed between said arcuate wall portions when said ring members are in a lower position and, upon raising said ring members to an elevated position and rotating said ring members with respect to said base member, said arcuate extensions abut the upper ends of said wall portions to maintain said ring members in said elevated position.

33. The support device of claims 30, 31 or 32, wherein each of said gripping members define a pair of arcuate portions having extended ends and inwardly directed ends, hinge means for pivotally connecting said inwardly directed ends, and container abutment means adjacent said hinge means, one of said extended ends of each of said gripping members being fixed to said first ring member and moveable with respect to said second ring member and the other of said extended ends being fixed to said second ring member and moveable with respect to said first ring member such that relative rotation of said ring members causes said arcuate portions to undergo pivotal movement about said hinge means and said abutment means to move in a substantially radial direction inwardly toward or outwardly from the common central axis of said ring members for securing and releasing a container disposed within said ring members.

34. The support device of claim 33, wherein the extended ends of said gripping members define vertically disposed studs thereon, one of said studs on each of said gripping members extending upwardly from said gripping member and the other of said studs on each of said gripping members extending downwardly from said gripping members, said upwardly extending studs engaging one of said ring members and said downwardly extending studs engaging the other of said ring members such that upon imparting relative rotation to said ring members, one of the studs on each of said gripping members is caused to move in an arcuate path either toward or away from the other stud on said gripping member thereby causing said pivotal and radial movement of said gripping members.

35. The support device of claim 33 wherein the extended ends of said gripping members define vertically disposed studs extending upwardly and downwardly therefrom, said first and second ring members define a plurality of equidistantly spaced slots therein and a corresponding plurality of equidistantly spaced arcuate guide channels therein, one of said studs on each of said gripping members extending into a slot on said first ring member and into a guide channel on said second ring member and the other stud of each of said gripping members extending into a slot on said second ring member and into a guide channel on said first ring member such that upon imparting relative rotation to said ring members, one of the studs on each of said gripping members is caused to move in an arcuate path either toward or away from the other stud on said gripping members thereby causing said pivotal and radial movements of said gripping members.

36. An adjustable support device particularly adapted for use in a vehicle for releasably securing therein an open container to prevent the spillage of the contents thereof, said device comprising:
a first ring member;
a second ring member;
means for securing said first ring member to said second ring member so as to allow relative rotation of said ring members about a common central axis; and
a plurality of container gripping members carried by and disposed between said ring members, each of said gripping members comprising a pair of arcuate arm portions and hinge means disposed between and pivotally joining said arm portions, said arm portions being adapted to pivot about said hinge means and project inwardly of said ring members in a substantially radial direction therefrom in response to relative rotation of said ring members to abut the container proximate said hinge means and secure said device to the container.

37. The supporting device of claim 36 wherein said arm portions of said gripping members are constructed of a flexible material such that upon said gripping member abutting the container in response to relative rotation of said ring members, said arm portions flex and urge said gripping members against the container.

38. The support devices of claim 36 or 37 including a base member having a friction contact surface adapted to rest on a horizontal surface in a vehicle, a container support surface disposed above said contact surface and an upper portion disposed above said container support surface, said upper portion defining said second ring member.

39. An adjustable support device particularly adapted for use in a vehicle for releasably securing therein an open container to prevent the spillage of the contents thereof, said device comprising:
a first ring member;
a second ring member disposed below said first ring member in axial alignment therewith such that said first and second ring members circumscribe a container receiving area; and
a plurality of container gripping members carried by and disposed between said ring members, each of said gripping members comprising a pair of arm portions and hinge means pivotally joining said arm portions, said gripping members being moveable in response to relative rotation of said ring members between a retracted position wherein said gripping members are disposed exteriorly of said container receiving area and a container gripping position, each of said gripping members pivoting about said hinge means thereon and projecting inwardly in a substantially radial direction from said ring members as said gripping members are moved from said retracted position toward said extended gripping position.

40. The support device of claim 39 wherein said arm portions of said gripping members of our arcuate configuration and constructed of a flexible material such that upon said gripping members abutting the container in response to relative rotation of said ring members, said arm portions flex and urge said gripping members against the container.

41. The support devices of claims 1, 30, 36 or 39 wherein said gripping members are disposed in a common horizontal plane such that said gripping members project from said ring members perpendicularly with respect to the central axis of said ring members and abut a container disposed therewithin at equal elevations whereby the container is stabilized within said ring members.

42. The securement device of claim 39 including a base member having a friction contact surface adapted to rest on a horizontal surface in a vehicle, a container support surface disposed above said contact surface and below said container receiving area, and an upper portion disposed above said container support surface, said upper portion defining said second ring member.

43. An adjustable support device particularly adapted for use in a vehicle for releasably securing therein an open container to prevent the spillage of the contents thereof, said device comprising:
- a first ring member;
- a second ring member;
- means for securing said first ring member to said second ring member so as to allow relative rotation of said ring members about a common central axis; and
- a plurality of container gripping members, each of said gripping members comprising a pair of arm portions having extended ends and inwardly directed ends and hinge means for pivotally joining said inwardly directed ends, said extended ends being carried by and disposed between said ring members such that upon relative rotation of said ring members, said extended ends of each gripping member are drawn together and said inwardly directed ends pivot about said hinge means and project in a substantially radial direction from said ring members to abut the container and secure said device to the container.

44. The device of claim 43 wherein said arm portions of said gripping members are of an arcuate configuration and constructed of a flexible material such that upon said gripping members abutting the container in response to relative rotation of said ring members, said arm portions flex and urge said gripping members against the container.

45. The device of claim 44 wherein said gripping members are of single piece construction and said hinge means comprises a living hinge disposed at a central location on each of said gripping members.

46. The devices of either claims 43, 44 or 45 including a base member having a friction contact surface adapted to rest on a horizontal surface in a vehicle, a container support surface disposed above said contact surface and an upper portion disposed above said container support surface, said upper portion defining said second ring member.

* * * * *